Oct. 19, 1948.   W. A. MILLER ET AL   2,451,761
ANTISKID CROSS CHAIN
Filed Oct. 7, 1943   2 Sheets-Sheet 2
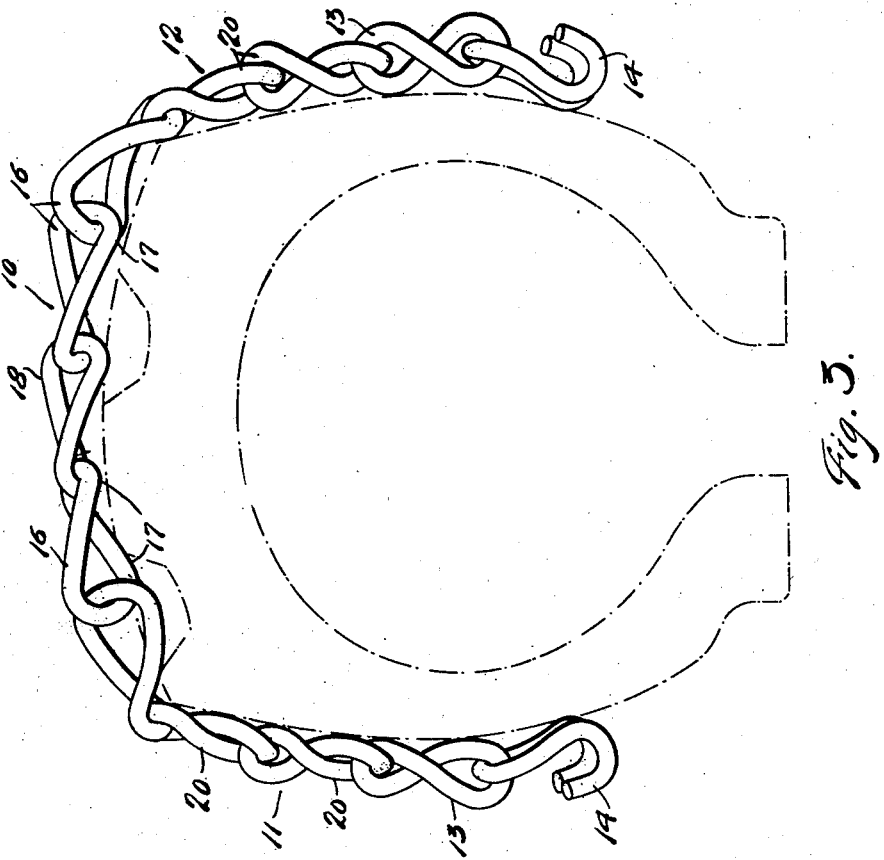
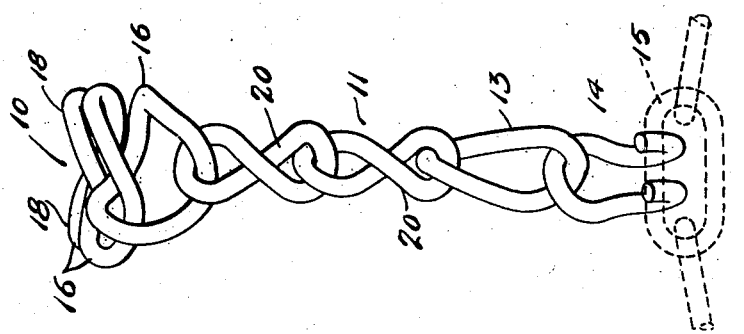
INVENTORS
WILLIAM A. MILLER, ROBERT E. GERSPACHER
BY
ATTORNEYS Patented Oct. 19, 1948

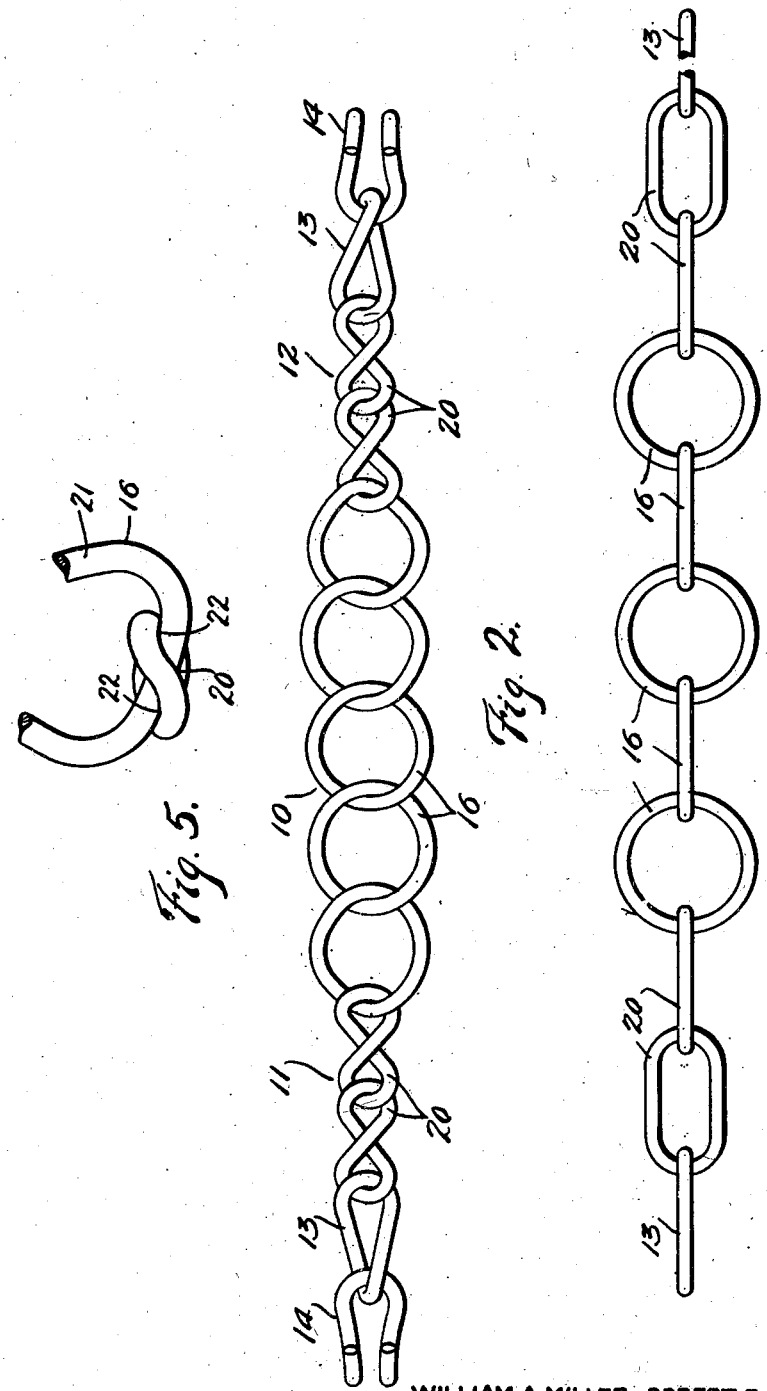

2,451,761

UNITED STATES PATENT OFFICE 2,451,761

ANTISKID CROSS CHAIN

William A. Miller, Buffalo, and Robert E. Gerspacher, Kenmore, N. Y., assignors to Columbus McKinnon Chain Corporation, Tonawanda, N. Y., a corporation of New York Application October 7, 1943, Serial No. 505,344

3 Claims. (Cl. 152—243)

Our invention relates in general to chains for antiskid or traction devices for use on tires of motor vehicles, and more particularly to cross chains for large size tires.

As is well known to those skilled in the art, large pneumatical tires are now being used on implements for use on farms and road work, such for instance, as tractors, and suitable means must be provided for preventing the skidding or slipping of the tire when it is passing through mud, deep loose earth or snow.

When ordinary curb links have been used in antiskid cross chains, the roll produced in the links under certain traction conditions causes the links in some cases to be rotated to a position where they will be supported on their edges and in other cases the cross chains will be completely turned over in which position they may remain for repeated revolutions of the tire, thus preventing desirable creeping of the chain around the tire, resulting in injury to the tire, in each case.

The principal object of our invention has been to provide a cross chain having traction links so formed as to provide upstanding portions which offer very high resistance to slippage under certain traction conditions.

Another object has been to provide an antiskid cross chain having a connected section arranged adjacent each side of the tire which provides tension members for preventing undue rolling of the traction portion of the chain.

Another object has been to provide a chain having relatively large substantially circular traction members in the traction section and relatively narrow elongated links in the roll-resisting sections, the latter links being twisted to substantially S-shape, thereby forming links that will lie flatly against the side walls of the tire.

Another object has been to provide a cross chain having traction members relatively wide circumferentially of the tire, whereby upon tendency of the members to roll upon the tire the members will produce a tensional and slight twisting action on the roll-resisting sections, thereby taking up substantially all tensional and torsional slack in the latter sections and thus preventing further roll of the traction members.

A further object has been to provide a cross chain having ample, spaced road and tire engaging surfaces, thereby adding to the life of the cross chain.

Furthermore, the traction section of our chain is formed of large traction members of relatively small cross sectional area thereby providing large open centers which will readily clear themselves of the accumulation of mud or earth.

Moreover, the roll-resisting sections of our chain are of such proportions as to bring the hooks connecting the chains to the side chains at a point below the center of the tire side walls, thereby preventing injury to the tire.

A further object has been to provide a method of assembling and twisting a cross chain, whereby some of the links will be cradle-shape and others S-shape.

The above objects and advantages have been accomplished by the device shown in the accompanying drawings, of which:

Fig. 1 is a view of our chain before twisting.

Fig. 2 is a top plan view of our chain after twisting.

Fig. 3 is a side elevation of our device showing it engaged with a tire.

Fig. 4 is a side elevation showing the position assumed by the chain as its engages the tire; and Fig. 5 is a fragmentary plan view, somewhat enlarged.

The cross chain shown in the drawings is only one of a number of cross chains used preferably in a complete antiskid chain of the rim chain type, only one of the chains being shown for clearness and convenience of illustration.

Our chain comprises a traction section 10 with a roll-resisting section 11 and 12 arranged one at each end of the traction section. A joiner link 13 is arranged at the outer end of each of the roll-resisting sections, and the customary hook 14 is used to connect the ends of the complete twisted chain to the side chains 15, one of which is shown in fragmentary manner in Fig. 4 by broken lines.

The traction section 10 of our tire is made up, preferably, of relatively large traction members 16 which may be in the form of substantially circular links. The widely circumferentially-spaced side of these members, therefore, act as fulcrums when the member is tipped due to the rolling tendency of the chain, thereby placing a tensional pull upon the roll-resisting sections 11 and 12 of the chain. In the course of manufacture, as hereinafter described, these traction members are preferably twisted somewhat in order to give to each link two oppositely arranged road-engaging portions 18 which extend upwardly between two interspaced oppositely arranged tire-engaging portions 17, thereby forming protruding traction elements. This twisting produces a substantially curved link of semi-circular shape or cradle-shape when viewed from the end and in such position where the road-engaging portions 18 are symmetrically arranged on each side of the line of vision. When the term cradle-shape is used hereinafter in this specification or in the claims, a link of this kind is referred to.

The roll-resisting sections 11 and 12 of our chain have inter-connected links 20 which are preferably of regular elongated shape when assembled as shown in Fig. 1, and which in the course of twisting are formed in the 8-shape shown in the drawings. In the formation of these 8-shape links, the twisting is continued so that the opposite sides of each link substantially touch each other and the twisting is preferably continued so that the sides will be pressed against each other or, as hereinafter described, folded upon each other, as clearly shown in the drawings, particularly in Fig. 4. By so twisting adjacent links in the process of manufacture, there will be only a slight degree of torsional play when assembling the cross chains upon the side chains. There will also be only a slight degree of torsional play between the end of each roll-resisting section and the traction section when assembling the parts so that upon slight initial rolling tendency of the traction portion when in action substantially all longitudinal flexibility in the roll-resisting portion itself and in the connection thereof to the traction portion will be removed and each roll-resisting portion will become substantially rigid and thereby act as a lever to resist the roll of the traction portion when the rolling tendency is in the right direction, as clearly shown in Fig. 3 and later described. In order to produce these results it is necessary to twist opposite ends of the links 20 through an angle of at least 180°, and, as shown in Fig. 5, the twisting may be carried some degrees beyond this point in order to cause the engaging ends of adjacent links to snugly fit and to become substantially rigid longitudinally when the torsional slack is removed. When in the specification and claims we refer to a link of 8-shape, we mean a link so twisted that its sides are closed one upon the other. The joiner link 13 is also of the usual elongated shape, and which in the process of twisting is formed in the curb-shape shown.

In the process of manufacturing our cross chain the traction members 16, the links 20, and the joiner links 13 are assembled as shown in Fig. 1 after which the ends of the links and members are welded. The completely assembled chain is now placed in the usual twisting lathe, well known in the art, by attaching the joiner links to the hooks of the headstock and tailstock of the lathe. The lathe is started and an end of the chain is rotated, while the other end is held stationary, thereby twisting the chain, as illustrated in Fig. 2. In the course of twisting, all links start to twist and the traction members are given an initial cradle-shape as the links 20 are twisted to curb-shape. Continued twisting of the ends of the links through at least 180° causes the sides of the links 20 to be folded upon themselves to a degree which causes the contacting sides to be oppositely curved toward each other, thus shaping the links in the form of a figure 8. After the links of the roll-resisting sections are thus twisted, the traction members are given their final twist to the desired and predetermined cradle-shape. Since the joiner links 13 are held by the hooks of the twisting lathe, they are prevented from twisting beyond the point where curb-shaped links are formed, as shown in the drawings which as is well known by those skilled in the art is a link having its ends twisted through an angle of substantially 90°.

As shown in Fig. 2, the traction section 10 of our chain is preferably of such a length as to bring the ends thereof at substantially the circumferential edges of the tread of the tire. The roll-resisting portions 11 and 12 of our chain which engage the side walls of the tire, will therefore depend from the ends of the traction section, assuming an angle therewith as shown in Fig. 3. The hooks 14 at the free ends of the chain serve to connect such ends to the rim or side chains 15 of the complete chain, one of which is shown in broken lines in Fig. 4.

When our cross chain is twisted as above described, the twisting is carried on so that when the chain is in position upon the tire as shown in Figs. 3 and 4, and held in place by means of the side or rim chains 15, there will be a slight amount of torsional slackness in the links of the roll-resisting sections thereby normally providing the required amount of flexibility. Furthermore, when our chains are assembled there is a slight amount of tensional slack in the roll-resisting sections whereby the entire chain may creep about the tire in the customary manner. When each of the cross chains of our invention comes in contact with a road where additional traction is needed, as for instance when being used in loose earth or mud, the traction section of the chain will tend to roll. When the traction member 16 nearest one of the links 20 of the roll-resisting section tends to roll, the trailing side of the member will be forced into bearing contact with the tire where it will act as a pivot point for the links as the opposite side thereof tends to move upwardly in its attempt to roll. Since the traction members are relatively large and the sides thereof widely spaced, such pivotal action will tend to pull on the roll-resisting section connected to the member at a point midway between its sides. Such movement will, therefore, first take out of the roll-resisting section all slackness and make it taut. When this section is taut, all further roll of the traction section is prevented by the rim or side chain 15. Moreover, when the traction member is rolled about its trailing side as a pivot, the connected link of the roll-resisting section will be slightly twisted, thereby taking up all the torsional slack hereinbefore referred to and making of the roll-resisting section a substantially rigid arm rigidly connected to the engaging member of the traction section, thereby also resisting the rolling tendency of the traction section. The traction section, therefore, of our tire is kept from undue rolling action. Since none of the traction members are permitted to roll through more than 90°, they will readily assume their normal tire-engaging positions when released from the traction positions.

The positions assumed by the connecting links at the ends of the traction section and one of the roll-resisting sections as shown in Fig. 5, where further pivotal or rocking movement of the traction member about its tire-engaging side 21 is prevented by the torsional resistance to clockwise twisting of the roll-resisting section offered by the link 20 owing to the intimate contact of said member and link at points 22.

As hereinbefore described, it is preferable to twist the entire chain as a unit from end to end in the course of manufacture. When such a chain is used, one of the roll-resisting sections will prevent rolling of the traction section of the chain when the tire bearing the same is being revolved in one direction, and the roll-resisting section at the opposite side of the tire will resist rolling when the tire is being rotated in the opposite direction. Where, however, it is desired to resist rolling at both ends of the traction section of the chain, the twisting of one of the roll-resisting sections may be accomplished as a separate operation and the direction of such individual twisting will be reversed from the direction in which the opposite roll-resisting section is twisted. Furthermore, while we have shown and described circular-shaped traction members 16 twisted to cradle shape, it is obvious that two adjacent traction members may be connected by welding or otherwise to form substantially 8-shape members or be formed in individual links twisted to 8-shape in the course of manufacture. Moreover, while these members are shown and described as having a round cross section, they may be made of stampings having any desired or suitable cross sections. Moreover, it is obvious that the number of links may be varied to suit varying conditions and sizes of tires. Furthermore, while we have shown and described our cross chain as being used in connection with side chains of the rim chain type, it is obvious that the cross chains may be used with the emergency type antiskid device. These, as well as other modifications of the details herein shown and described, are within the scope of our invention.

Having thus described our invention, what we claim is:

1. A cross chain for a vehicle tire comprising links defining a traction section for engagement with the tread portion of the tire, an anchoring section at each end of said cross chain, and a roll limiting section connecting said traction section with each of said anchoring sections, each link of said traction section having a relatively wide and cradle-shape form, said traction section normally lying in substantially flat contact with the tread of the tire and movable to tilt about the longitudinal axis of the chain toward an outwardly projecting attitude relative to the tire tread thereby increasing the cleat effect thereof while twisting the roll limiting and anchoring sections to remove slack from the chain until further tilting movement of said traction section will be resisted.

2. In combination with a vehicle tire, a cross chain comprising links defining a traction section for engagement with the tread portion of the tire, an anchoring section at each end of said cross chain, and a tilt limiting section connecting said traction section with each of said anchoring sections and lying against a side wall portion of the tire, each link of said traction section having a relatively wide and twisted form, said traction section normally lying in substantially flat contact with the tread of the tire and movable to tilt about the longitudinal axis of the chain toward a substantially radially projecting attitude relative to the tire tread thereby increasing the cleat effect thereof while twisting the tilt limiting and anchoring sections to remove slack from the chain until further tilting movement of said traction section will be resisted.

3. A cross chain for a vehicle tire comprising links defining a traction section for engagement with the tread portion of the tire, an anchoring section at each end of said cross chain, and a roll limiting section of figure 8 shaped links connecting said traction section with each of said anchoring sections, each link of said traction section having a relatively wide and open cradle-shape form, said traction section normally lying in substantially flat contact with the tread of the tire and movable to tilt about the longitudinal axis of the chain toward a substantially radially projecting attitude relative to the tire tread thereby increasing the cleat effect thereof while twisting the roll limiting and anchoring sections to remove slack from the chain until further tilting movement of said traction section will be resisted.

WILLIAM A. MILLER.
ROBERT E. GERSPACHER.

REFERENCES CITED

The following references are of record in the file of this patent:

UNITED STATES PATENTS

| Number | Name | Date |
| --- | --- | --- |
| 1,079,907 | Weed | Nov. 25, 1913 |
| 1,518,515 | Johnston, Jr. | Dec. 9, 1924 |
| 1,536,556 | Beckwith | May 5, 1925 |
| 1,543,436 | Hood | June 25, 1925 |
| 1,584,636 | Negowski | May 11, 1926 |
| 1,586,387 | Senft | May 25, 1926 |
| 1,665,098 | Johnson | Apr. 3, 1928 |
| 1,678,063 | Herchert | July 24, 1928 |
| 1,743,497 | Standish | Jan. 14, 1930 |
| 1,814,716 | Lewis | July 14, 1931 |
| 2,109,038 | Pierre | Feb. 22, 1938 |
| 2,116,116 | Hilliard | May 3, 1938 |
| 2,171,995 | Schmidt | Sept. 5, 1939 |
| 2,180,101 | Conner et al. | Nov. 14, 1939 |

FOREIGN PATENTS

| Number | Country | Date |
| --- | --- | --- |
| 412,153 | Germany | 1925 |